United States Patent [19]

Pipon et al.

[11] Patent Number: 4,789,205

[45] Date of Patent: Dec. 6, 1988

[54] ARTICULATION FOR A SEAT BACK COMPRISING A COMPOSITE BEARING PLATE

[75] Inventors: Yves Pipon; Georges Droulon, both of Flers, France

[73] Assignee: A. & M. Cousin Etablissements Cousin Freres, Flers, France

[21] Appl. No.: 11,822

[22] Filed: Feb. 6, 1987

[30] Foreign Application Priority Data

Feb. 7, 1986 [FR] France ............................ 86 01702

[51] Int. Cl.⁴ .............................................. B60N 1/02
[52] U.S. Cl. .................................... 297/367; 297/366; 297/379; 16/341
[58] Field of Search .............................. 297/363–367, 297/379; 16/341

[56] References Cited

U.S. PATENT DOCUMENTS

| | | | |
|---|---|---|---|
| 3,727,978 | 4/1973 | Barriere et al. | 297/379 X |
| 4,076,309 | 2/1978 | Chekirda et al. | 297/379 X |
| 4,103,970 | 8/1978 | Homier | 297/379 X |
| 4,523,786 | 6/1985 | Letournoux et al. | 297/367 |

FOREIGN PATENT DOCUMENTS

| | | | |
|---|---|---|---|
| 3027629 | 2/1982 | Fed. Rep. of Germany | 297/367 |
| 2578602 | 9/1986 | France | 297/379 |
| 2117440 | 10/1983 | United Kingdom | 297/366 |

Primary Examiner—Kenneth J. Dorner
Assistant Examiner—Laurie K. Cranmer
Attorney, Agent, or Firm—Browdy and Neimark

[57] ABSTRACT

The articulation comprises in combination a fixed flange, a mobile flange, a slidable composite bearing plate and a cam. The fixed flange is provided with a lower recess and the mobile flange is provided with a recess in registration with and larger than the lower recess of the fixed flange. The slidable bearing plate is formed of two parts bearing together along a straight line and having lower toothings cooperating with a corresponding toothing of the mobile flange, the lower toothing of one of the two parts extending in said corresponding toothing while the lower toothing of another one of the two parts extends only in part in said corresponding toothing.

4 Claims, 1 Drawing Sheet

U.S. Patent    Dec. 6, 1988    4,789,205
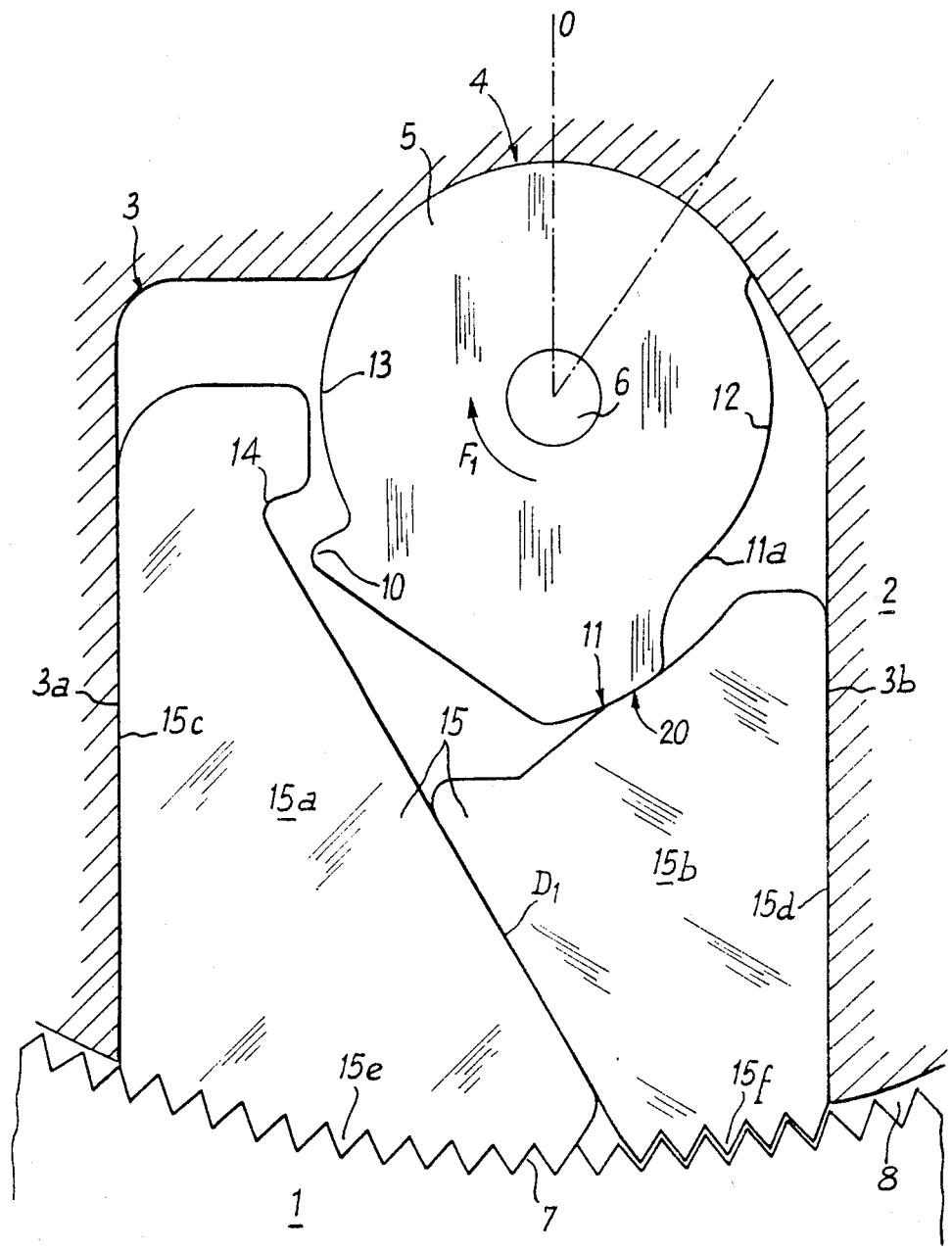

ARTICULATION FOR A SEAT BACK COMPRISING A COMPOSITE BEARING PLATE

BACKGROUND OF THE INVENTION

The object of the present invention is an articulation for the back of a seat, which articulation is made of a first flange rigidly connected to the sitting portion of the seat and therefore fixed, and a second flange rigidly connected to the back of the seat and therefore mobile with respect to the aforementioned fixed first flange, the mobile second flange being mounted on a pin rigidly connected to the fixed first flange.

Many articulations for a seat back are already known and comprise a blockage member between the fixed portion and the mobile portion of the articulation, which blockage member is made of a single bearing plate sliding under action of a cam, this bearing plate having a lower portion which is toothed in order to cooperate with a toothing carried by a lower part of the mobile portion of the articulation.

It has however been found that such articulations with a single bearing plate exhibit a small play due to manufacturing tolerances provided for their assembly. It should also be noted that when, under an abnormal effort due to a violent impact, the single bearing plate is caused to imprint on the guiding zone and, also, the toothings of the bearing plate, which cooperate with toothings provided in the mobile portion, are caused to sag. The back of the seat is therefore not perfectly fixed any more with respect to the sitting portion, thereby reducing the comfort of the user of the seat and being a cause of possible serious accidents due to later heavy impacts.

Moreover, in order to increase comfort, ever thinner and thinner toothings have been used, and which accept only badly an imperfect engagement of the bearing plate caused either by a play due to manufacturing tolerances or by a subsiding of the material on the bearing zone of the bearing plate.

OBJECTS OF THE INVENTION

The present invention remedies these disadvantages by providing an articulation for a seat back made of a fixed flange and a mobile flange. The fixed flange is formed with a recess in which are placed on the one hand the control cam and on the other hand a composite bearing plate having a curved lower toothing; these parts being in turn contained in a recess of the mobile flange the lower portion of which is formed with a curved toothing cooperating with the curved lower toothing of the composite bearing plate.

There is thus obtained, due to a correct guiding of the composite bearing plate by the side walls of the fixed flange recess and by the angle chosen for the toothing carried by the lower portion of the composite bearing plate, a correct blocking without play of the seat back with respect to the sitting portion.

SUMMARY OF THE INVENTION

According to the invention, the articulation for a seat back comprising in combination a fixed flange, a mobile flange, a slidable composite bearing plate and a cam, with said fixed flange being provided with a lower recess and said mobile flange being also provided with a recess in registration with said lower recess and larger than said lower recess, said fixed and mobile flanges being mounted on a high articulation axis with said fixed and mobile flanges being respectively movable and being blockable with respect to one another by means of the slidable composite bearing plate, said cam controlling displacement of said slidable composite bearing plate and being subjected to action of a driven shaft with said cam being provided with a stepped portion and a nose, and said slidable bearing plate being guided by parallel walls of said recess and being formed of two parts bearing together along a straight line, and wherein said two parts have lower toothings cooperating with a corresponding toothing of said mobile flange, the lower toothing of one of the two parts extending in said corresponding toothing while the lower toothing of another one of the two parts extends only in part in said corresponding toothing, whereby providing a play compensation when the stepped portion pushes downwardly said another one of the two parts of said slidable composite bearing plate.

According to another feature of the invention, the nose cooperates with a notch of said one of the two parts of said slidable composite bearing plate for disengaging said lower toothings from the toothing of the mobile flange, whereby making said mobile flange free with respect to said fixed flange, and causing a disengagement of the stepped portion which thus frees said another one of the two parts of said slidable composite bearing plate.

Various other features of the invention will become more apparent from the following detailed description.

BRIEF DESCRIPTION OF THE DRAWINGS

An embodiment of the invention is shown by way of non limiting example in the accompanying drawing, wherein the single FIGURE shows at a larger scale the central portion of an articulation for a seat back with a composite bearing plate.

DESCRIPTION OF THE INVENTION

In the drawing there is shown schematically an axis 0 used as an articulation for a mobile flange 1 with respect to a fixed flange 2. The fixed flange 2 is formed, in its lower portion, with a housing or recess 3 of a substantially rectangular shape ending in its upper portion by a semi-circular cell 4 provided for containing a cam 5 fixed to a shaft 6, rotation of the shaft 6 being controlled either manually or by a motive member such as an electric or pneumatic motor or even an electromagnet.

The parallel walls 3a, 3b of the recess 3 are perfectly adjusted for guiding perfectly a composite bearing plate 15 made of two parts 15a, 15b. Due to an offsetting of the axis 0, the mobile flange 1 which is rigidly connected to the seat back comprises, in its lower portion, a toothing 7 inscribed in a recess 8 which is much larger than the recess 3. Thus, the toothing 7 is longer and placed on an arc of a circle the center of which is placed on the axis 0.

The cam 5 is provided with a nose 10 and a stepped portion 11. The stepped portion 11 is followed at its rear portion 11a by a cylindrical portion 12 centered on the shaft 6, and the nose 10 is placed after a cylindrical portion 13 also centered on the haft 6 but having a radius different than that of the cylindrical portion 12. The nose 10 is adapted for cooperating with a notch 14 of the part 15a of the bearing plate 15, the part 15b of which bearing plate 15 is subjected to action of the stepped portion 11.

The parts 15a, 15b of the bearing plate 15 are jointed along a straight line D1 the inclination of which is such that the outer edges 15c, 15d of the parts 15a, 15b are perfectly applied along the parallel walls 3a, 3b of the recess 3.

Toothings 15e ad 15f of the parts 15a, 15b of the bearing plate 15 are identical and therefore the toothing 15e of the part 15a will extend in a correct manner in the teeth of the toothing 7 of the mobile flange 1. However the dimensions of the part 15b of the bearing plate 15 are such that the teeth 15f can, under no circumstance whatever, extend completely in the teeth of the toothing 7, but are slightly retracted for providing a perfect blockage of the teeth 15e of the part 15a. As long as the stepped portion 11 is applied against the central portion 20 of the part 15b, it applies perfectly the part 15a against the toothing 7, and therefore the mobile flange 1 is perfectly fixed with the fixed flange 2, thereby providing a perfect locking of the seat back with respect to the sitting portion of the sea in consideration.

If, during operation and due to a wear of the teeth, there is caused a slight play, the latter is immediately compensated since the teeth 15f can always be brought nearer the toothing 7 while pushing perfectly the teeth 15e in the toothing 7. Thereby are avoided any plays of the seat back with respect to the sitting portion of the seat.

When it is required to unlock the seat back with respect to the sitting portion, one proceeds in the following manner:

By using a manual or motorized means, one drives the shaft 6 in order to drive the shaft 6 in direction of arrow $F_1$ (see drawing), the effect of which is:

(a) to bring the nose 10 in engagement with the notch 14 and therefore to lift the part 15a of the bearing plate 15 and;

(b) to disengage the stepped portion 11 from the central portion 20 of the part 15b of the bearing plate 15, so that this bearing plate 15 is pushed upwardly and therefore the teeth 15e and 15f are separated from the toothing 7.

At that moment, the mobile flange 1 is free with respect to the fixed flange 2 and a position desired for the back of the seat can be chosen by pushing the back of the seat against action of return spring or springs which are normally present.

When the chosen position is thus reached, the shaft 6 is brought back in a direction contrary to that of arrow $F_1$, which causes immediately a downward movement of the bearing plate 15 since the part 15b of the bearing plate 15 is pushed back by the stepped portion 11 and since the part 15a is driven by the part 15b.

The angle between the straight line D1 and the horizontal, which is between 55° and 65°, and more specially between 58° and 62°, is chosen so as to ensure a correct sliding motion for a simple and easy positioning of the two parts 15a and 15b of the bearing plate 15 without any risk of a tedious jamming.

What is claimed is:

1. An articulation for a seat back comprising
   a fixed flange (2) having a lower recess, and a mobile flange (1) adjacent said fixed flange,
   a slidable composite bearing plate (15) and a cam (5) moveably mounted within the lower recess (3) and said mobile flange (1) being also provided with a recess (8) in registration with the lower recess (3) and being larger than said lower recess (3),
   said fixed and mobile flanges being mounted on an articulation axis (0) above said movable flange with said fixed and mobile flanges being alternatively movable and fixed with respect to one another by means of said slidable composite bearing plate (15),
   a drive shaft (6) for rotating said cam (5) to control displacement of said slidable composite bearing plate, said cam being provided with a stepped portion (11) and a nose (10),
   said slidable bearing plate (15) being guided by parallel walls (3a, 3b) of the lower recess (3) and being formed of first and second parts (15a, 15b) bearing together along a straight line (D1),
   said first and second parts of said bearing plate having lower toothings (15e, 15f) cooperating with a corresponding toothing (7) of said mobile flange (1), the lower toothing (15e) of said first part substantially fully engaging said corresponding toothing (7) while the lower toothing (15f) of said second part (15b) extends only partly within said corresponding toothing (7), whereby a degree of play exists to provide compensation when the stepped portion (11) pushes said second part (15b) of said slidable composite bearing plate (15).

2. An articulation according to claim 1, wherein said nose (10) cooperates with a notch (14) of said first (15a) of the two parts of said slidable composite bearing plate (15) for disengaging said lower toothings (15e, 15f) from the toothing (7) of the mobile flange (1), whereby making said mobile flange (1) free with respect to said fixed flange (2), and causing a disengagement of the stepped portion (11) which thus frees said second (15b) of the two parts of said slidable composite bearing plate (15).

3. An articulation according to claim 1, wherein said straight line (D1) is inclined between 55° and 65° with respect to the horizontal.

4. An articulation according to claim 1 wherein said straight line (D1) is inclined between 58° and 62° with respect to the horizontal.

* * * * *